(12) United States Patent
Venkatapathy et al.

(10) Patent No.: US 9,047,274 B2
(45) Date of Patent: Jun. 2, 2015

(54) MACHINE TRANSLATION-DRIVEN AUTHORING SYSTEM AND METHOD

(71) Applicant: Xerox Corporation, Norwalk, CT (US)

(72) Inventors: Sriram Venkatapathy, Grenoble (FR); Shachar Mirkin, Meylan (FR)

(73) Assignee: XEROX CORPORATION, Norwalk, CT (US)

( * ) Notice: Subject to any disclaimer, the term of this patent is extended or adjusted under 35 U.S.C. 154(b) by 343 days.

(21) Appl. No.: 13/746,034

(22) Filed: Jan. 21, 2013

(65) Prior Publication Data

US 2014/0207439 A1   Jul. 24, 2014

(51) Int. Cl.
G06F 17/28 (2006.01)

(52) U.S. Cl.
CPC ........ *G06F 17/2809* (2013.01); *G06F 17/2818* (2013.01); *G06F 17/2836* (2013.01)

(58) Field of Classification Search
CPC .................................................... G06F 17/2836
USPC ............................................................. 704/4
See application file for complete search history.

(56) References Cited

U.S. PATENT DOCUMENTS

| | | | |
|---|---|---|---|
| 6,163,785 A | 12/2000 | Carbonell et al. | |
| 6,182,026 B1 | 1/2001 | Tillmann et al. | |
| 6,275,789 B1 * | 8/2001 | Moser et al. | 704/7 |
| 6,385,568 B1 * | 5/2002 | Brandon et al. | 704/7 |
| 6,917,936 B2 | 7/2005 | Cancedda | |
| 8,781,810 B2 * | 7/2014 | Cancedda et al. | 704/2 |
| 2004/0024581 A1 | 2/2004 | Koehn et al. | |
| 2004/0030551 A1 | 2/2004 | Marcu et al. | |
| 2005/0137854 A1 | 6/2005 | Cancedda et al. | |
| 2006/0190241 A1 | 8/2006 | Goutte et al. | |
| 2007/0150257 A1 | 6/2007 | Cancedda et al. | |
| 2007/0265825 A1 | 11/2007 | Cancedda et al. | |
| 2008/0262826 A1 | 10/2008 | Pacull | |
| 2008/0300857 A1 | 12/2008 | Barbaiani et al. | |
| 2009/0175545 A1 | 7/2009 | Cancedda et al. | |
| 2011/0022380 A1 | 1/2011 | Zaslavskiy et al. | |
| 2011/0178791 A1 | 7/2011 | Stymne et al. | |
| 2011/0282643 A1 | 11/2011 | Chatterjee et al. | |

(Continued)

OTHER PUBLICATIONS

Choumane, et al. "Integrating translation services within a structured editor", Proc. of the 2005 ACM Symposium on Document engineering, 2005, pp. 165-167.

(Continued)

*Primary Examiner* — Susan McFadden
(74) *Attorney, Agent, or Firm* — Fay Sharpe LLP

(57) ABSTRACT

An authoring method includes generating an authoring interface configured for assisting a user to author a text string in a source language for translation to a target string in a target language. Initial source text entered by the user is received through the authoring interface. Source phrases are selected that each include at least one token of the initial source text as a prefix and at least one other token as a suffix. The source phrase selection is based on a translatability score and optionally on fluency and semantic relatedness scores. A set of candidate phrases is proposed for display on the authoring interface, each of the candidate phases being the suffix of a respective one of the selected source phrases. The user may select one of the candidate phrases, which is appended to the source text following its corresponding prefix, or may enter alternative text. The process may be repeated until the user is satisfied with the source text and the SMT model can then be used for its translation.

17 Claims, 11 Drawing Sheets

(56) References Cited

U.S. PATENT DOCUMENTS

| | | |
|---|---|---|
| 2011/0288852 A1 | 11/2011 | Dymetman et al. |
| 2011/0307245 A1 | 12/2011 | Hanneman et al. |
| 2012/0041753 A1 | 2/2012 | Dymetman |
| 2012/0101804 A1 | 4/2012 | Roth et al. |
| 2012/0259807 A1 | 10/2012 | Dymetman |
| 2013/0173297 A1* | 7/2013 | Hyde et al. .................. 705/3 |

OTHER PUBLICATIONS

Dymetman, et al. "XML and multilingual document authoring: Convergent Trends", in Coling, 2000, pp. 243-249.

Koehn, et al. "Enabling monolingual translators: Post-editing vs. options", Human Language Technologies: The 2010 Annual Conf. of the North American Chapter of the Assoc.1 for Computational Linguistics, 2010, pp. 537-545.

Koehn, et al. "Interactive assistance to human translators using statistical machine translation methods" Proc. of MT Summit XII, 2009, pp. 1-8.

U.S. Appl. No. 13/479,648, filed May 24, 2012, Nikoulina, et al.

U.S. Appl. No. 13/596,470, filed Aug. 28, 2012, Nikoulina, et al.

U.S. Appl. No. 12/427,149, filed Apr. 21, 2009, Dymetman, et al.

Denero, et al. "Why generative phrase models underperform surface heuristics" Proc. Workshop on Statistical Machine Translation, StatMT '06, ACL, pp. 31-38.

Moore, et al. "An iteratively-trained segmentation-free phrase translation model for statistical machine translation" Proc. $2^{nd}$ Workshop on Statistical Machine Translation, ACL 2007, pp. 112-119.

Blei, et al. "Latent Dirichlet Allocation" Journal of Machine Learning Research 3, 2003, pp. 993-1022.

Och, F. J. "Minimum Error Rate Training in Statistical Machine Translation" $41^{st}$ Annual Meeting of the Assoc. for Computational Linguistics (ACL), Jul. 2003, pp. 160-167.

Hu, et al. "The Value of monolingual crowdsourcing in a real-world translation scenario: simulation using haitian creole emergency sms messages", WMT '11, pp. 399-404, 2011.

* cited by examiner

Type in English to compose in German the transfer |

Amount of Phrase Suggestions: ● + o ++ o +++ o ++++ o +++++
Phrase look-ahead: [2▸]

Content words in input sentence: transfer
Similar sentence suggestions (click to select):

1. in reference to the aforementioned attachment and transfer order, we hereby request that you transfer the o
2. according to § 850 (d) zpo, the attachment and transfer order stipulates that you remain entitled to only na
3. as soon as nameentity informs us of the amount of their net rental payments, we will tally the two pensions t following month.
4. attachment and transfer order nameentity / nameentity.
5. attachment and transfer orders

Phrase lookups (select to auto-complete):

| | | |
|---|---|---|
| order (0.086153414975) | order) (0.0951033342855) | order plus a (0.0882972014440425) |
| them (0.0829361311496) | order plus (0.0891270438762)5 | order is served (0.0882242861439954) |
| ) (0.0829283935872)5 | them to (0.08293613149)6 | order, the (0.0829819229)56 |
| through (0.082682545868)25 | order has (0.082870155946)75 | order has already (0.082819854721)75 |
| address (0.0822699505)52 | order in (0.08285342163)5 | of property have (0.08267703393325) |

FIG. 11

MACHINE TRANSLATION-DRIVEN AUTHORING SYSTEM AND METHOD

BACKGROUND

The exemplary embodiment relates to machine translation and finds particular application in an authoring system that provides a user interface through which a user is guided to author a source text that is translated to a target language with improved quality and accuracy.

A common task in multilingual work environments is to compose messages in a language in which the author is not fluent. As an example, the customer service operations of multinational companies serve a multilingual customer base. To serve their customers, customer service agents may be organized into language desks, with each desk serving requests in a particular language. However, it is generally impractical to hire sufficient agents to provide agents who are fluent in all languages served by the customer service center. In addition, when there is an unexpected surge in the number of requests in a particular language, this may cause long delays in response times.

One way to solve these problems is to enable agents to handle multilingual requests using Machine Translation (MT) technology. Machine translation can be used effectively by customer service agents to interpret incoming requests in an unfamiliar language. Translations generated by current MT technology are often good enough for understanding the customer's message, even if they do not constitute a perfect translation or are not perfectly written. On the other hand, since MT is error-prone, it is often considered unsuitable to be used directly for composing replies to be sent to customers by the agents that are not fluent in the customer's language. Sending an erroneous or non-fluent message may not be well-received by the customers and may harm the company's reputation. Existing systems for computer-assisted translation assume that the users are fluent in both the source and target languages or at least have access to a translator who is fluent in both languages, which is not always the case.

One solution is for the output of the MT system to undergo a post-editing process before the reply is sent to the customer. That is, a person who is fluent in both the agent's and the customer's languages (source and target languages) reviews and edits the agent's message before it is sent. Such a post-editing step, which entails having knowledge of the target language, is generally too time consuming and not cost effective for service centers where many messages are being sent back and forth.

Various approaches have been developed to assist writers in producing multilingual documents. Dymetman, et al., proposed a Multilingual Document Authoring (MDA) system to provide interactive tools, such as context-aware menus, for assisting monolingual writers in the production of multilingual XML documents. See, Marc Dymetman, Veronika Lux, and Aarne Ranta, "XML and multilingual document authoring: Convergent trends," in COLING, pp. 243-249. Morgan Kaufmann, 2000. This system makes use of parallel grammars to compose text in two languages simultaneously, while assuming that the author has knowledge of a single language. U.S. Pat. No. 6,163,785 to Carbonell, et al., proposes a monolingual authoring tool to produce controlled language in the source language. Choumane, et al., provide interactive assistance to the author for reducing ambiguity in the source text, based on a set of manually defined rules. This assumes that reducing ambiguity will potentially yield a better translation. See, Ali Choumane, Hervé Blanchon, and Cécile Roisin, "Integrating translation services within a structured editor," Proc. 2005 ACM Symp. on Document Engineering, pp. 165-167.

However, templates or rules which have been tailored for one system may not be suitable for another, and the actual MT system being used and its models are not taken into account.

There remains a need for a system and method which allows authors to construct text in a target language in which they are not fluent.

INCORPORATION BY REFERENCE

The following references, the disclosures of which are incorporated herein in their entireties by reference, are mentioned:

Phrase based machine translation systems are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al.; U.S. Pub. No. 2004/0024581 entitled STATISTICAL MACHINE TRANSLATION, by Koehn, et al.; U.S. Pub. No. 2004/0030551 entitled PHRASE TO PHRASE JOINT PROBABILITY MODEL FOR STATISTICAL MACHINE TRANSLATION, by Marcu, et al.; U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; U.S. Pub. No. 2007/0265825, published Nov. 15, 2007, entitled MACHINE TRANSLATION USING ELASTIC CHUNKS, by Nicola Cancedda, et al.; U.S. Pub. No. 2011/0022380, published Jan. 27, 2011, entitled PHRASE-BASED STATISTICAL MACHINE TRANSLATION AS A GENERALIZED TRAVELING SALESMAN PROBLEM, by Mikhail Zaslayskiy, et al.; U.S. Pub. No. 2011/0178791, published Jul. 21, 2011, entitled STATISTICAL MACHINE TRANSLATION SYSTEM AND METHOD FOR TRANSLATION OF TEXT INTO LANGUAGES WHICH PRODUCE CLOSED COMPOUND WORDS, by Sara Stymne, et al.; U.S. Pub. No. 2011/0282643, published Nov. 17, 2011, entitled STATISTICAL MACHINE TRANSLATION EMPLOYING EFFICIENT PARAMETER TRAINING, by Samidh Chatterjee, et al.; U.S. Pub. No. 2011/0288852, published Nov. 24, 2011, entitled DYNAMIC BI-PHRASES FOR STATISTICAL MACHINE TRANSLATION, by Marc Dymetman, et al.; U.S. Pub. No. 2011/0307245, published Dec. 15, 2011, entitled WORD ALIGNMENT METHOD AND SYSTEM FOR IMPROVED VOCABULARY COVERAGE IN STATISTICAL MACHINE TRANSLATION, by Gregory Hanneman, et al.; U.S. Pub. No. 2012/0041753, published Feb. 16, 2012, entitled TRANSLATION SYSTEM COMBINING HIERARCHICAL AND PHRASE-BASED MODELS, by Marc Dymetman; U.S. Pub. No. 2012/0101804, published Apr. 26, 2012, entitled MACHINE TRANSLATION USING OVERLAPPING BIPHRASE ALIGNMENTS AND SAMPLING, by Benjamin Roth, et al.; U.S. Pub. No. 2012/0259807, published Oct. 11, 2012, entitled PROBABILISTIC SAMPLING USING SEARCH TREES CONSTRAINED BY HEURISTIC BOUNDS, by Marc Dymetman; U.S. application Ser. No. 13/479,648, filed on May 24, 2012, entitled DOMAIN ADAPTATION FOR QUERY TRANSLATION, by Vassilina Nikoulina, et al.; and U.S. application Ser. No. 13/596,470, filed on Aug. 28, 2012, entitled LEXICAL AND PHRASAL FEATURE DOMAIN ADAPTATION IN STATISTICAL MACHINE TRANSLATION, by Vassilina Nikoulina, et al.

Methods for building libraries of parallel corpora from which bilingual dictionaries can be generated are disclosed, for example, in U.S. Pub. No. 20080262826, published Oct. 23, 2008, entitled METHOD FOR BUILDING PARALLEL CORPORA, by Francois Pacull; and U.S. patent application Ser. No. 12/427,149, filed on Apr. 21, 2009, entitled BIPHRASE FILTERING FOR STATISTICAL MACHINE TRANSLATION, by Marc Dymetman, et al.

Methods for evaluating the quality of machine translation are disclosed, for example, in U.S. Pub. No. 2005/0137854, published Jun. 23, 2005, entitled METHOD AND APPARATUS FOR EVALUATING MACHINE TRANSLATION QUALITY, by Nicola Cancedda, et al., U.S. Pat. No. 6,917,936, issued Jul. 12, 2005, entitled METHOD AND APPARATUS FOR MEASURING SIMILARITY BETWEEN DOCUMENTS, by Nicola Cancedda; and U.S. Pub. No. 2009/0175545, published Jul. 9, 2009, entitled METHOD FOR COMPUTING SIMILARITY BETWEEN TEXT SPANS USING FACTORED WORD SEQUENCE KERNELS, by Nicola Cancedda, et al.

BRIEF DESCRIPTION

In accordance with one aspect of the exemplary embodiment, an authoring method includes generating an authoring interface configured for assisting a user to author a text string in a source language for translation to a target string in a target language. The method further includes receiving source text comprising initial text entered by the user through the authoring interface in the source language. A set of source phrases is selected from a stored collection of source phrases. Each of the source phrases in the set of source phrases includes at least one token of the initial source text as a prefix and at least one other token as a suffix. The selection of the set of source phrases is based on a translatability score. The translatability score, for each of a stored set of source phrases, is a function of statistics of at least one of a collection of biphrases in which the source phrase occurs in combination with a corresponding target language phrase. The method further includes proposing a set of candidate phrases for display on the authoring interface. Each of the identified candidate phases is the suffix of a respective one of the source phrases in the set of source phrases. The method further includes providing for receiving a user's selection of one of the candidate phrases in the set and, where one of the candidate phrases in the set is selected by the user, appending the selected one of the candidate phrases to the source text. Optionally, the method further includes repeating the receiving, selecting, proposing and providing steps to generate the text string in the source language, wherein in the repeating of these steps, the received text comprises the initial source text in combination with the previously appended text. One or more of the receiving, selecting, proposing and providing can be performed with a computer processor.

In another aspect, an authoring system includes an interface generator for generating an authoring interface on an associated display device for assisting a user to author a text string in a source language for translation to a target string in a target language. A suggestion system is provided for receiving source text comprising initial text entered by a user through the authoring interface in the source language and for selecting a set of source phrases from a stored collection of source phrases, each of the set of source phrases including at least one token of the initial source text as a prefix and at least one other token as a suffix. The selection of the set of source phrases is based on a translatability score which, for each of a stored set of source phrases, is a function of statistics of at least one biphrase from a collection of biphrases in which biphrase the source phrase occurs in combination with a corresponding target phrase in the target language. The suggestion system is configured for proposing a set of candidate phrases for display on the generated interface, the candidate phases each comprising the suffix of a respective one of the source phrases in the set of source phrases. The authoring interface is configured for receiving a user's selection of one of the candidate phrases in the set of candidate phrases and, where one of the candidate phrases in the set is selected by the user, for appending the selected one of the candidate phrases to the source text. The suggestion system is configured for generating the text string in the source language from the initial source text and appended text. A processor implements the interface generator and suggestion system.

In another aspect, a method for training an authoring system includes acquiring a collection of source phrases in a source language from a set of biphrases derived from a parallel corpus of sentences in the source language and a target language. For each of the source phrases, the method includes computing a translatability score as a function of biphrase statistics derived from the parallel corpus for at least one of the biphrases in the set of biphrases for which the source phrase is a source phrase of the biphrase. The computed translatability scores are stored in memory. A scoring function is stored for scoring each of a set of candidate phrases to be presented to an author for appending to initial source text during authoring of a source string in the source language. Each of the candidate phrases, in combination with a portion of the source text, forms one of the source phrases in the collection. The scoring function is configured for scoring candidate phrases based on the translatability score, enabling the author to be presented with candidate phrases ranked according to scores output by the scoring function through an authoring interface.

BRIEF DESCRIPTION OF THE DRAWINGS

FIG. 11 illustrates a screenshot of an authoring interface generated by the system of FIG. 1 in a first stage of authoring a text string in accordance with another aspect of the exemplary embodiment.

DETAILED DESCRIPTION

Figure 1:
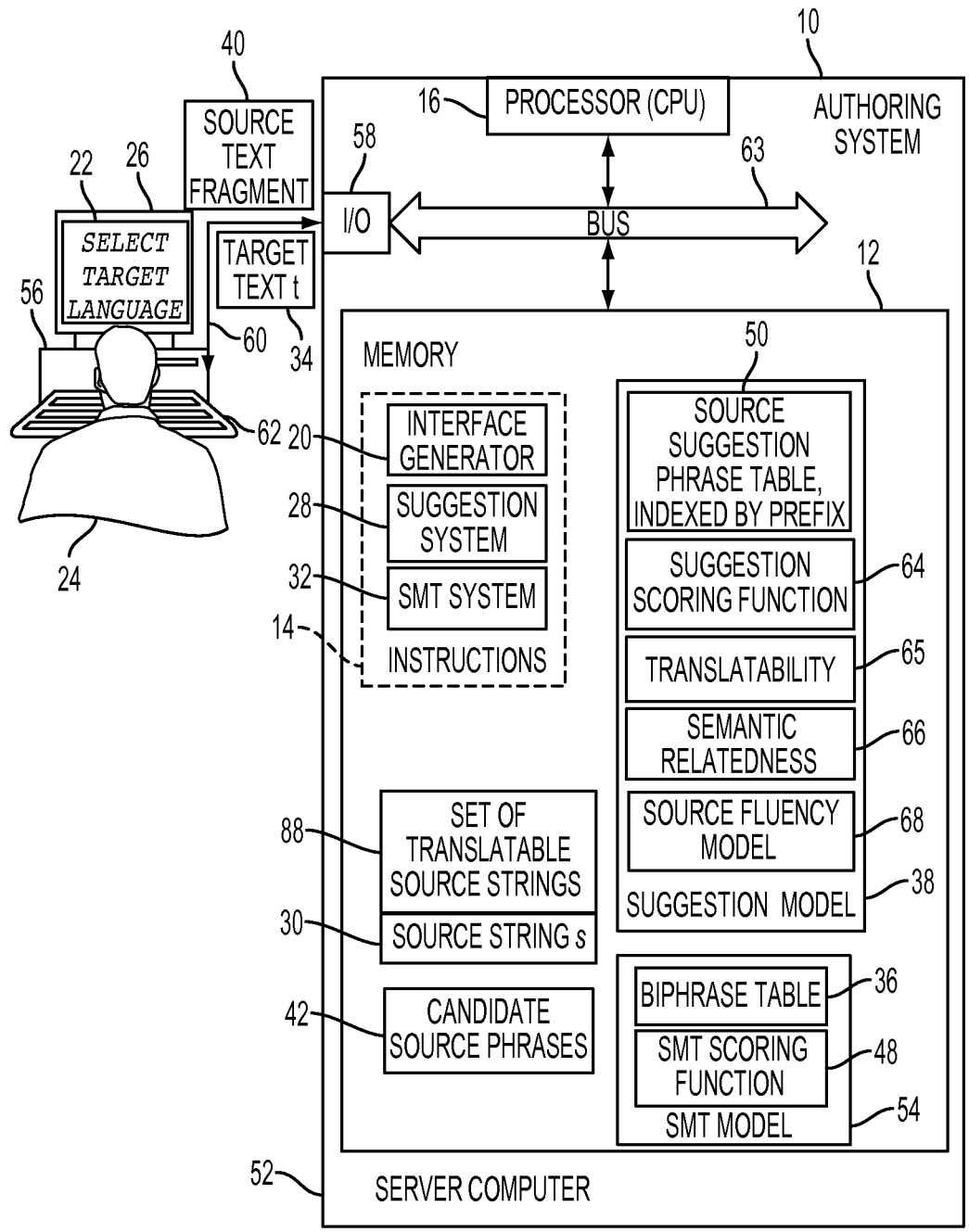
FIG. 1 is a functional block diagram of a cross-language authoring system in accordance with one aspect of the exemplary embodiment.

Aspects of the exemplary embodiment relate to an authoring system and method which employ Statistical Machine Translation (SMT) for enabling an author to compose a written text message in a source language which is translated into a target language without requiring a knowledge of the target language. The author may be an agent in a customer service department or other person seeking to compose more accurate replies in a language unfamiliar to him or her.

An authoring interface is generated that is driven by statistical machine translation technology. The authoring interface aims to produce an more accurate message in an unfamiliar language, without needing to use any specialized resource. It only assumes the existence of parallel sentences, e.g., in the domain of interest, which can be acquired relatively easily.

By way of background, a biphrase is a pair of phrases (each phrase comprising a sequence of one or more words), one phrase from the source language and the other from the target language which an automated system used for extracting biphrases from a parallel corpus has output as a translation of each other in at least the source language to target language direction. Biphrases may be formed from contiguous sequences of words or in some embodiments, may accept one or more gaps.

A "biphrase table" includes a set of biphrases for the source/target languages. In a conventional biphrase table, each biphrase is associated with lexical and phrasal probabilities which express the frequency with which the individual words (or entire phrase) are found together in a bi-sentence (pair of sentences) in the parallel corpus. Some phrases may have several different translations, some of which are more commonly occurring than others.

In an example embodiment, a "token" refers to a single word, but can also be a punctuation mark, such as a period, comma, etc. Thus, some biphrases in the biphrase table may include tokens which are not words.

Conventional SMT systems operate by identifying biphrases from the biphrase table which cover words of a source text string and then output a target text string using a subset of the biphrases by optimizing a translation score over a set of possible translations.

In the present system and method, the composition of the reply by the agent in the desired language is achieved using an interactive interface in which the agent is guided to progressively compose a message in his native language, which can be translated more accurately by the SMT system. The composition guidance is driven by the SMT system. The message is then translated by the SMT system.

The SMT system thus plays a dual role: for interactive composition of source-language messages and for their translation into the target language. Using the SMT system to guide the composition of the source text by the agent improves the accuracy of the translation. In the exemplary embodiment, the interface prompts the agent to choose those phrases that can be translated more accurately by the SMT system. In contrast, a message composed directly by the agent may contain terminology and sentence structure that the SMT system cannot translate accurately.

Apart from improving the accuracy of the translation, the method also improves composition speed. This is achieved by providing an interface that allows the agent to click on desired phrases to extend the current text, thereby saving typing. The display of full sentences from the translation memory that are similar to the user's input at any particular time may also be employed to enhance the composition speed.

Figure 2:
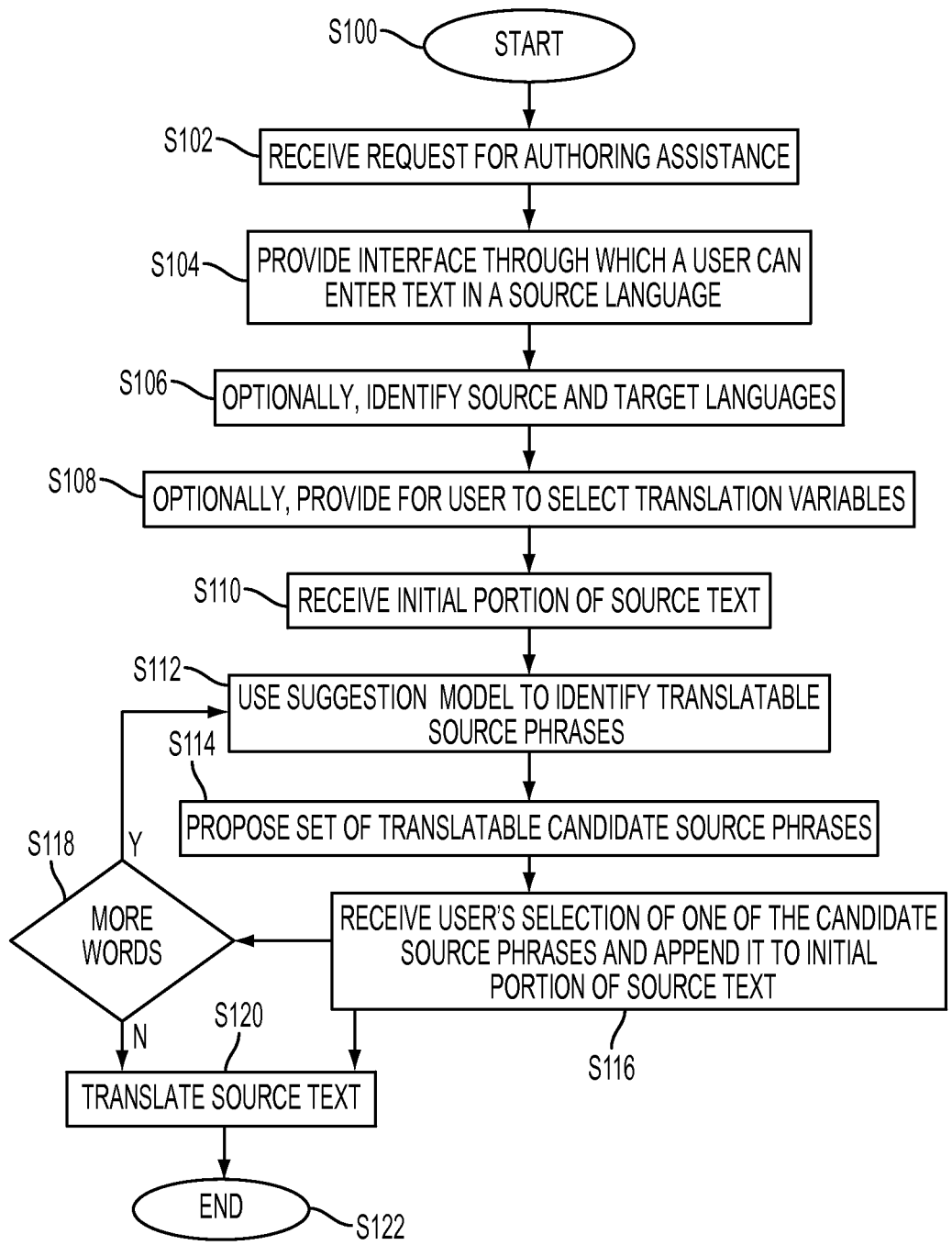
FIG. 2 is a flow chart of a cross-language authoring method in accordance with another aspect of the exemplary embodiment.

FIG. 1 illustrates an authoring system 10 in accordance with the exemplary embodiment. The system 10 includes main memory 12 which stores software instructions 14 for performing an authoring method as shown in FIG. 2 and a processor 16 in cooperation with the memory 12 for executing the instructions.

Figure 3:
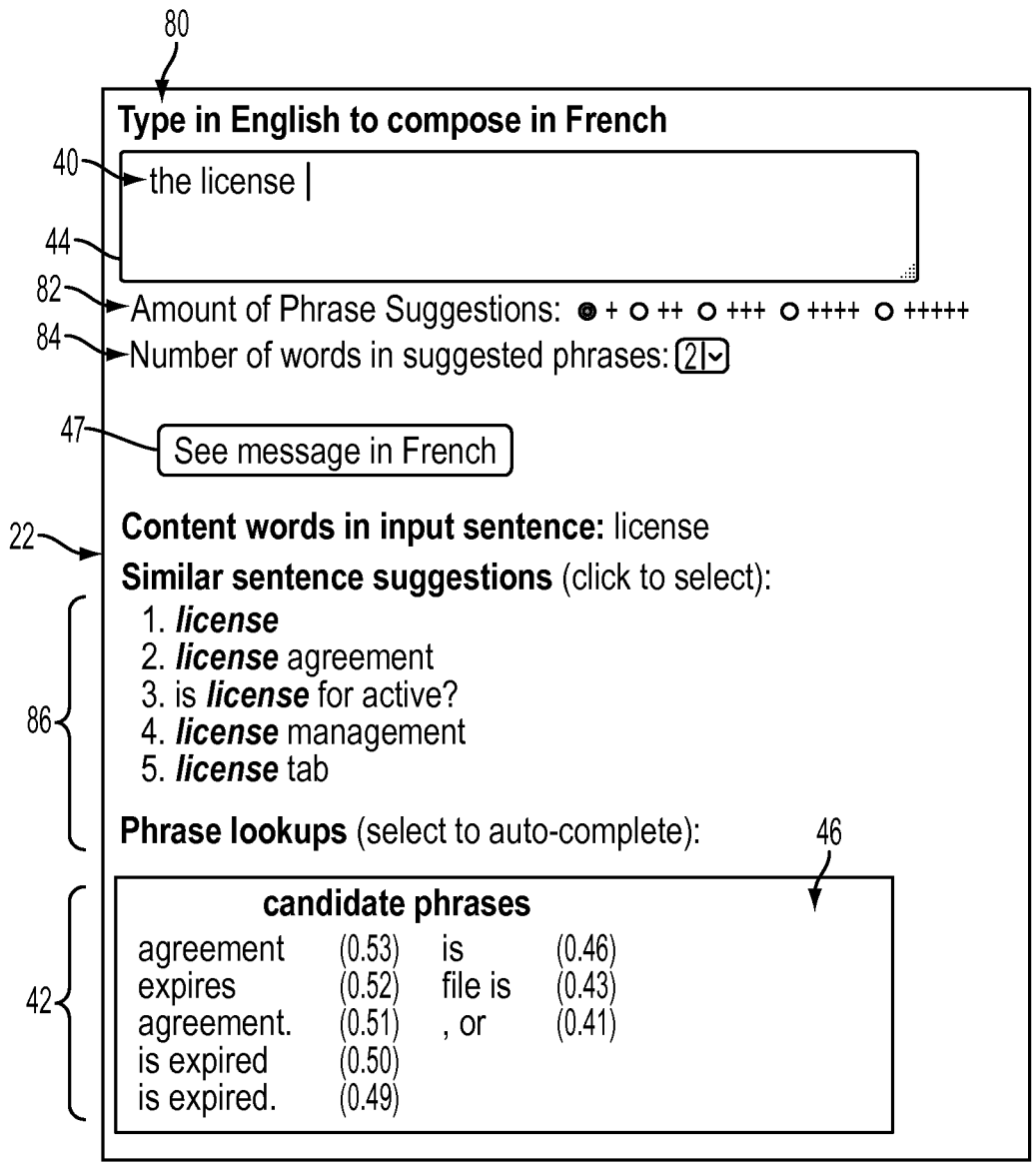
FIG. 3 illustrates a screenshot of an authoring interface generated by the system of FIG. 1 in a first stage of authoring a text string.

The instructions 14 include an interface generator 20 which generates an authoring interface 22 for display to a user 24 on a display device 26, such as a computer monitor, LCD screen, or the like. An example authoring interface 22 is illustrated in FIG. 3. The interface generator 20 cooperates with a suggestion system 28 to guide the user, such as a customer service agent, in constructing a source text string 30 composed of a sequence of tokens in a source natural language, such as English or French, which is then translated by a statistical machine translation (SMT) system 32 into a target string 34 in a target language, different from the source language. The SMT system 32 includes a decoder which makes use of a biphrase table 36, as described above, in generating the translated text 34. The suggestion system utilizes a suggestion model 38 which evaluates candidate source phrases for completing the source string as it is being composed.

The suggestion system 28 receives as input a source text fragment 40, such as a word or phrase in the source language that is input by the user, e.g., via the interface 22. Based on the fragment, the suggestion system 28 generates a set of candidate source phrases 42 some or all of which are presented to the user via the authoring interface 22. For example, as illustrated in FIG. 3, the authoring interface includes a text editing box 44, in which a user enters a source text fragment 40 (the words "the license") which includes one or more words that the user would like to develop into a translatable source string 30. The suggestion system proposes candidate source phrases 42 in a phrase suggestion region 46 of the interface 22, which may be presented in a ranked order, the ranking being based on the translatability, as computed by suggestion model 38. The user can select one of the displayed candidate source phrases 42, or may enter different text in the text editing box. The process is an iterative one, with further candidate phrases being proposed to the user based on the current text in the editing box, until the user is satisfied with the source string and clicks on a translation icon 47 which causes the SMT system 32 to translate the text in the editing box using biphrases drawn from the biphrase table 36 and an SMT scoring function 48, such as a weighted loglinear scoring function, which uses features computed based on corpus statistics of the biphrases that are used in generating a candidate translation.

Returning to FIG. 1, the source suggestion model 38 includes a source suggestion phrase table 50 which is derived from the biphrase table 36. In particular, the phrase table 50 includes a collection of phrases (of one or more words or other tokens) in the source language that are extracted from the biphrase table 36. Each source phrase in the phrase table 50 is associated with a respective translatability score which is a measure of its relative ease of translation. The translation score is computed based on the corpus statistics (probabilities) for the corresponding biphrase(s) in the biphrase table 36.

The authoring system 10 may be hosted by a suitable computing device or devices, such as the illustrated server computer 52. While the exemplary authoring system 10 is illustrated as including the SMT system 32, it is to be appreciated that the authoring system 10 may be used solely for generation of the source string 30, with a separate computing device hosting the machine translation system 32 and its model 52, which includes the biphrase table 36 and SMT scoring function 48.

In the illustrated embodiment, the authoring interface 22 is generated for display on a display device 26 of an associated client device 56 which is communicatively connected with a network interface 58 of the computing device 52 via a wired or wireless link 60, it is also contemplated that the authoring system may be hosted by the client device itself, i.e., by the computer used by the user 24 for composing the source string.

The I/O interface 58 may communicate, directly or indirectly, with one or more of a display 26 for displaying information to users, speakers, and a user input device 62, such as a keyboard or touch or writable screen, and/or a cursor control device, such as mouse, trackball, or the like, for inputting text and for communicating user input information and command selections to the processor 16. The various hardware components 12, 16, 58, of the computer 52 may be all connected by a bus 63.

The computer device 52 may be a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. The network interface 58 allows the computer to communicate with other devices via a computer network, such as a local area network (LAN) or wide area network (WAN), or the internet, and may comprise a modulator/demodulator (MODEM) a router, a cable, and/or Ethernet port. Memory 12 stores instructions for performing the exemplary method as well as the processed data.

The digital processor 16 can be variously embodied, such as by a single-core processor, a dual-core processor (or more generally by a multiple-core processor), a digital processor and cooperating math coprocessor, a digital controller, or the like. The exemplary digital processor 16, in addition to controlling the operation of the computer 52, executes instructions stored in memory 12 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The exemplary authoring system 10 can be utilized by a user 24 who is unfamiliar with the target language. The system addresses two problems that affect the translation produced. The first is the source distance. This is the semantic distance between the composed source message and the intended source message. A high distance corresponds to a different meaning of the composed message relative to the intended one. In such cases, the SMT system 32 cannot be expected to generate a translation whose meaning is close to the desired message. While this is a factor which is controlled by the agent 24, i.e., the agent may choose to deviate from the intended message as much as he deems appropriate, the authoring system 10 helps to minimize the semantic deviation by suggesting phrases 42 which can be appended to the already typed source text that are semantically related to the already typed text. The second problem addressed by the system is translatability, which is the ability of the SMT system 32 to translate a given source string. This factor is controlled by the authoring system by proposing to the user only those phrases that can be translated more accurately, thereby ensuring that the produced translation of the composed message is close to its true translation.

Figure 4:
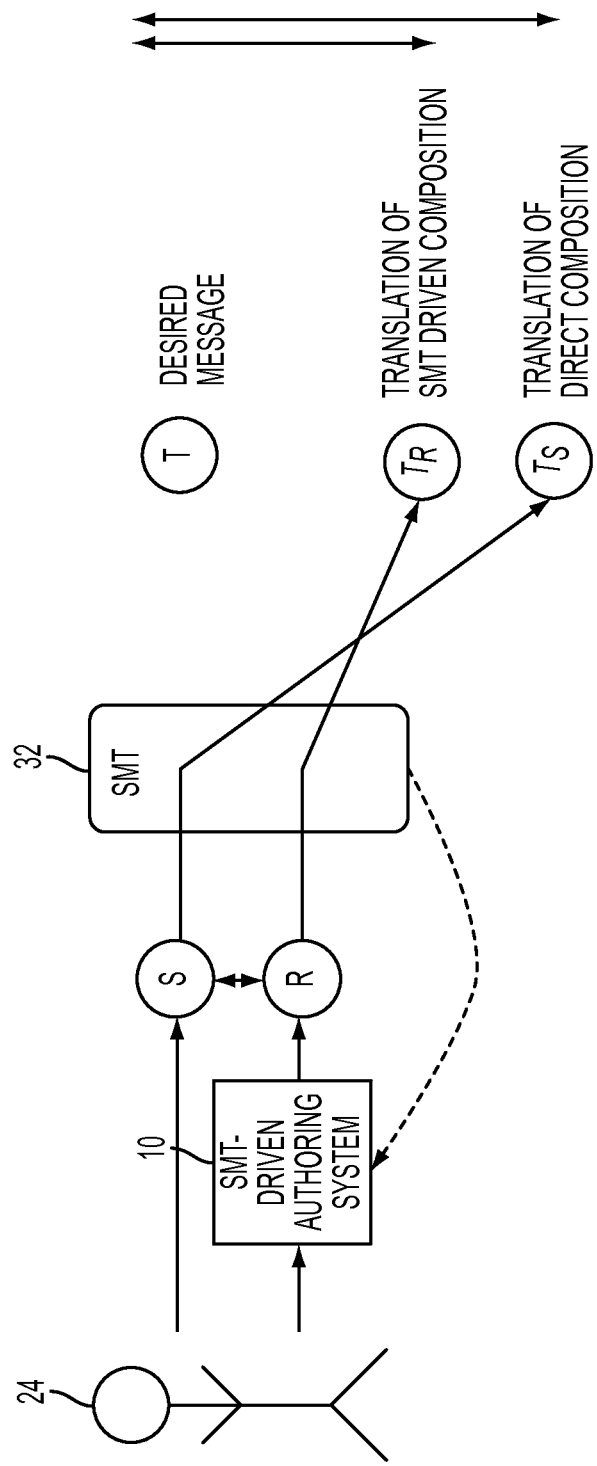
FIG. 4 graphically illustrates the objective of the exemplary method.

As an example, with reference to FIG. 4, let S be an intended reply, in the source language, which the agent 24 wishes to provide to a customer and let T be the corresponding desired reply in the target language. Assume that S cannot be accurately translated by the SMT system 32. Hence, when the SMT system 32 is used to translate S, it produces a translation $T_S$ that is far from the desired message. In contrast, the SMT-driven authoring system 10 interactively guides the agent to choose phrases that can be translated accurately, while not deviating too much from the meaning of intended message S. Using it, the agent can compose a message R that can be translated more accurately by the SMT system, resulting in a translation $T_R$ that is relatively much closer to the desired message T.

As will be appreciated, in cases where the intended message S can be translated accurately, the SMT driven authoring system 10 will drive the agent to compose S itself. So, in general, the authoring system 10 is expected to produce at least as good a translation as the direct translation of the intended message S.

The distance between the desired translated message (T) and the actual translation ($T_R$) produced using the exemplary method is therefore determined by the two factors noted above, the distance between the intended source message and the produced one (between S and R) and the translatability of R.

In the exemplary system and method, each of the phrases in the source suggestion table 50 is associated with a respective translatability score which is a measure of the translatability of the source phrase.

Figure 5:
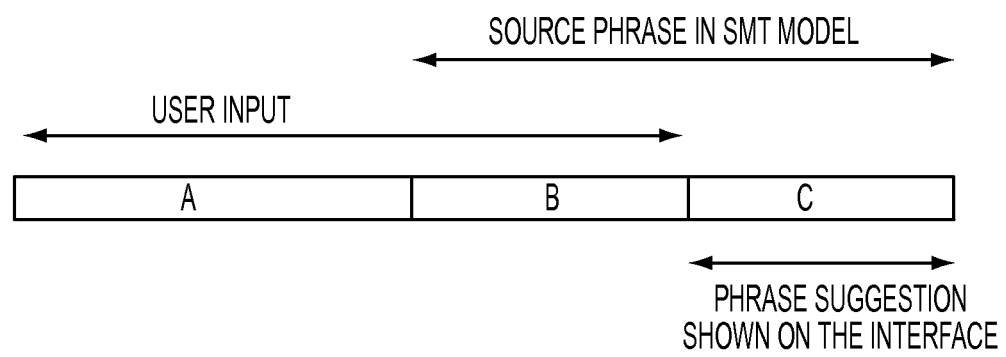
FIG. 5 illustrates the generation of a phrase suggestion from a source phrase stored in the exemplary SMT model.

FIG. 5 illustrates the relationship between the user input 40 and the source phrases 42. Assuming that the text entered includes components A and B, where component B includes one or more tokens and component A includes zero, one, or more words. The system identifies source phases in table 50 of the form BC, where B is considered a suffix of at least a terminal part of the user input and is also a prefix of a respective source phrase in table 50. Component C includes one or more tokens which may be proposed as one of the candidate phrases 42 on the interface. For example, in FIG. 3 the word license, or the two words the license may be a suffix B in one or more source phrases in the source phrase table and the candidate phrases C include agreement, and so forth, because the table 50 includes phrases such as the license agreement and/or license agreement.

When proposing candidate phrases 42, the suggestion system 28 takes the translatability scores TS of source phrases into account. The translatability score may be the only feature used in the selection or may be one of a plurality of features that are considered in selecting candidate phrases 42 for proposing to the user from among a set of source phrases that each include one or more of the words of the entered text 40. Other features which may be considered in selecting candidate phases to propose may include fluency and/or semantic relatedness, as discussed below. The suggestion score of each candidate phrase may be expressed as:

$$\text{Suggestion score}(C)=\text{funct}(TS,FS,SRS,\text{etc}) \quad \text{Eqn. (1)}$$

where funct indicates a function, such as an optionally weighted sum, product, log linear combination, or other aggregation of the translatability score TS, a fluency score FS, and a semantic relatedness score SRS. The system then proposes, as candidates C, those for which the corresponding phrase BC in table 50 has a high suggestion score.

Other ways of using combinations of features to identify the candidate phrases are also contemplated. For example, the features TS, FS, and SRS may be considered in a predetermined sequence and only those candidates with a threshold score may be retained in a pool for further consideration based on one or more of the other features. By way of example, the suggestion model 38, in addition to storing a suggestion scoring function 64 for computing the suggestion score(C), may also store a translatability model 65 for computing the translatability score TS, a sematic relatedness model 66 for computing the semantic relatedness score SRS, and a source fluency model 68, such as a language model, for computing the fluency score FS. The semantic relatedness model 66 allows candidates which correspond to the topics used in the input text to be identified as being semantically-related to the input text, which is quantified as the semantic relatedness score SRS. The source language model 68 includes frequencies, in the source language, of sequences of words, which can be used to compute the fluency feature FS for a given candidate phrase based on what has already been typed. Other features can be used in Eqn. 1 in addition to or in place of the example features. The model 38 also stores weights for each of the features used so that the features can be aggregated in a weighted combination.

Figure 6:
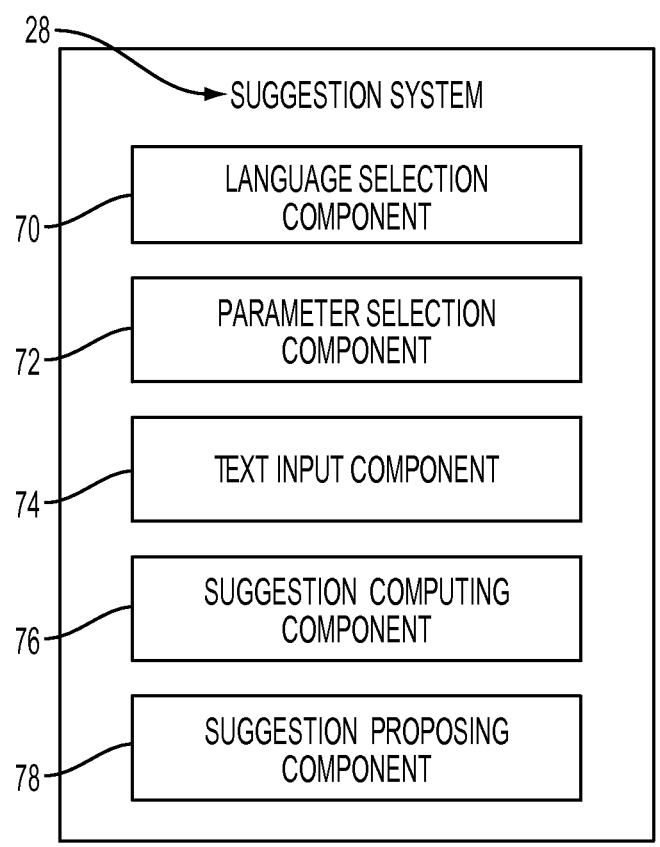
FIG. 6 illustrates software components of the exemplary suggestion system of FIG. 1.

FIG. 2 illustrates an exemplary translation method which can include assisting a user to compose a source sentence using the system of FIG. 1. FIG. 6 illustrates components of the suggestion system 28 which can be used in the method, which include a language selection component, parameter selection component 70, text input component 72, suggestion computing component 74, and suggestion proposing component 76.

The method of FIG. 2 begins at S100.

At S102, a request is received for authoring assistance, for example, the user contacts the authoring system 10 via a web browser on the client device 56 via link 60.

At S104, the authoring interface 22 is generated (e.g., by interface generator 20 and/or a thin client operating on client device 56) for display on the display device 26 client device 56.

At S106, provision may be made, e.g., via the authoring interface 22, for the user to identify the source and target languages. This functionality may be provided by the language selector component 70 of the authoring system. In other embodiments, one or both of these may be defined by default. The user's selections are received by the system. The interface then provides an appropriate instruction 80 for the selected languages on the interface (FIG. 3).

At S108, provision may be made to select translation variables, such as a maximum number of candidate source phrases that the system can propose at a given time and/or a number of words in the suggestion. This functionality may be provided by the parameter selector component 72 of the authoring system. For example, as illustrated in FIG. 3, the interface 22 at 82 allows the user to select from different amounts of candidate phrases, where + indicates few, ++ indicates more, etc. The user can also select from various numbers of words in the candidate phrases, such as from 1-6, at 84. The selectors 82, 84 may be replaced by a sliding bar or other user actuable method of selecting the maximum number of words in a candidate phrase or the maximum number of candidate phrases to be displayed in the interface at a time (see, for Example the interface of FIGS. 7 and 8).

At S110 an initial portion of text 42 in the source language is received. For example, the user types or otherwise enters one or two (or more) words in the source language in the text editing box 44 and the word(s) are transmitted to the system 10 and stored in memory, e.g., by the text input component 74. The system may wait until the user has finished typing a few words or may move to S112 as soon as one word has been typed (e.g., by detection of use of the space key).

At S112, one or more candidate source phrases are identified, e.g., by the suggestion computing component 76, based on the entered text. Each candidate source phrase may include one or more words from a phrase in the table 50 which has, as a prefix, one or more words of the entered text. For example, the suggestion computing component 76 employs the exemplary suggestion model 38 shown in FIG. 1 to identify and rank source phrases from the table 50 based on one or more of the translatability score, fluency, and semantic relatedness features, such as a weighted combination thereof.

At S114, a set of the most highly-ranked source phrases is used to generate candidate phrases (by removing the prefix part B) and these are presented by the suggestion proposing component, via the interface 22, to the user.

At S116, the user may select one of the candidate phrases, e.g., by clicking on it. The selected phrase is then automatically moved by the system to the text entering box 40. Alternatively, the user may not find a suitable phrase to express his desired response and may enter text of his own in the box 40. The user may continue typing. In some embodiments, the user may be presented with one or more stored source strings that have been generated previously e.g., by the user, or by a set of users using the authoring system and stored in memory, analogously to an autocomplete method, as shown at 86 in FIG. 3. The user can select one of these strings in place of a candidate phrase suggestion. These strings (e.g., sentences) are retrieved from the translation memory, i.e. from a set of sentences 88 (FIG. 1) for which an approved good translation exists.

At S118, the system 10 may check to see if additional words have been added to the text editing box. The system may allow a certain amount of time to elapse before proposing the next set of candidate phrases or begin making new proposal as soon as a new word has been added. In some embodiments, the user may indicate that the response is complete, for example, by clicking on the icon 47. In other embodiments, the corresponding target text may be continuously updated as the user types.

Figure 7:
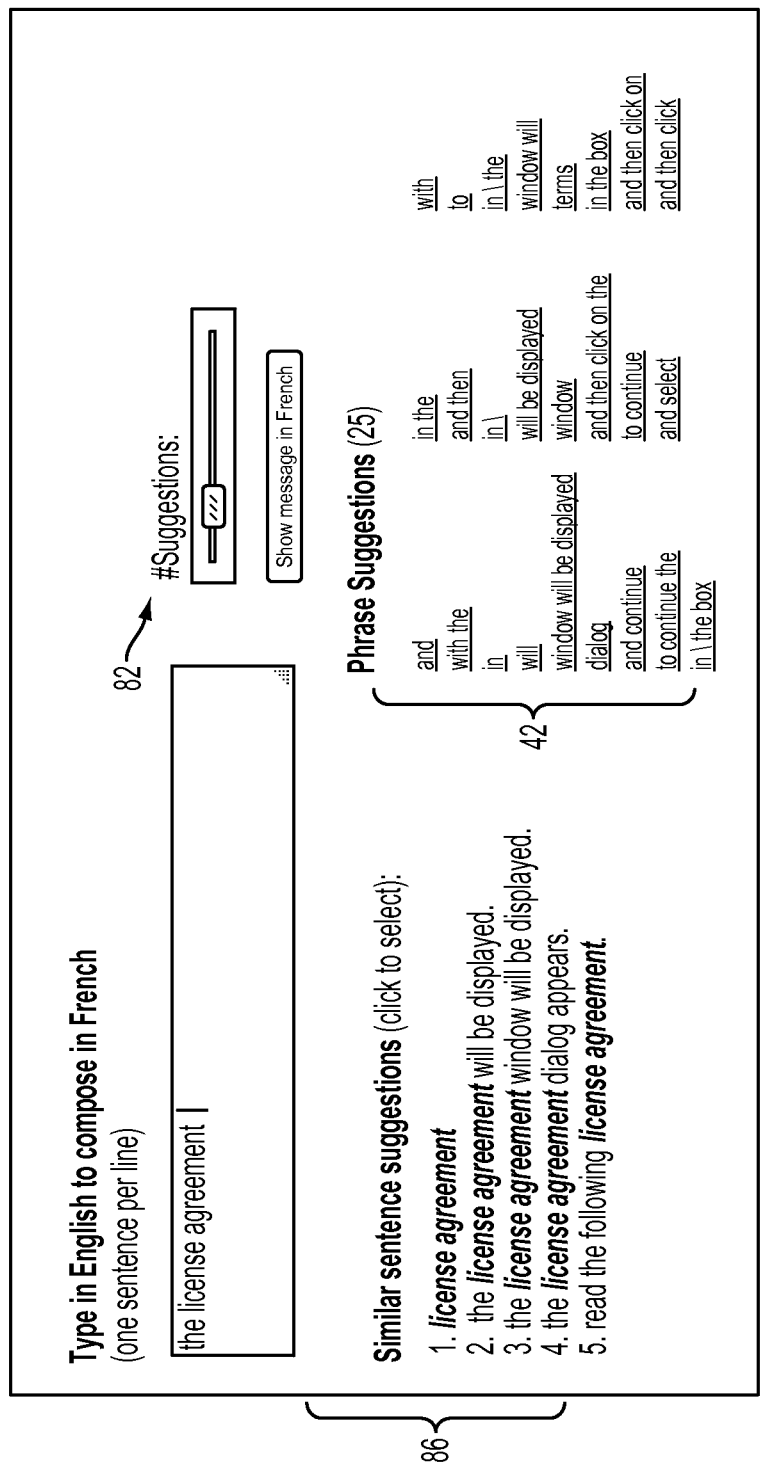
FIG. 7 illustrates a screenshot of an authoring interface generated by the system of FIG. 1 in a second stage of authoring a text string, in a second embodiment of the interface.
Figure 8:
FIG. 8 illustrates a screenshot of an authoring interface generated by the system of FIG. 1 in a final stage of authoring a text string.

If at S118, more words are added to the text editing box (by the user and/or by the system), the method may return to S112, and the method reiterates, proposing a new set of candidates, as illustrated in FIG. 7, until the user decides to end the sentence (FIG. 8).

At S120, the text in the editing box is translated to the target language by the SMT system 32. The translation may be initiated by the user (agent) or by the system. In performing the translation, the SMT system uses the biphrase table 36 that was used in generating the source phrase table translatability scores and also a language model, but in this case, the language model measures the fluency of the target string and thus is derived from target language documents. The translation may be displayed to the user, who may adopt the translation as his response to a customer's question or other textual message, particularly if he has at least a basic familiarity with the target language.

The method ends at S122.

Further details of the system 10 and method will now be described.

Interactive Interface

In an example interactive interface 22, as shown, for example, in FIGS. 3, 7, and 8, the agent has considerable flexibility in entering and editing text. The exemplary interface allows the agent to perform one or more of the following operations at any point of time:

1. Phrase selection: Select one of the phrase suggestions 42 to expand the sentence.

2. Sentence selection: Select a full or partial sentence from the list of sentences similar to the partial input.

3. Word composing: The agent can type a word if he does not want to use any of the suggestions provided.

In some embodiment, the agent can set one or two parameters to control the phrase suggestions displayed on the interface. These are:

1. k: This parameter controls the number of phrase suggestions that are displayed. In one embodiment, the user has the option to set k to 5, 10, 15, 20 or 25, via the selectable buttons 82 (FIG. 3) or can variably select the number within a predetermined range, using a slider (FIG. 8).

2. Look-ahead length: in one embodiment, the agent can set the look-ahead length (in number of words) of the phrase suggestions, via selector 84 (FIG. 3). The interface may also show phrase suggestions with look-ahead lengths that are one less and one greater than the one set by the user. In other embodiments, this feature is replaced by normalizing the computed scores(C) such that suggestions of different lengths are shown together (FIG. 8).

Computation and Scoring of Phrase Suggestions

While various methods of presenting phrase suggestions have been suggested above, the following illustrates one example method. The suggested phrases are selected and ranked according to the following criteria: translatability, fluency, and semantic relatedness.

1. Translatability: The phrase suggestions shown on the interface should have high translatability. Two different methods for evaluating translatability are proposed by way of example—maximum translation score mts and conditional entropy ce(s), either or both of which are incorporated into the translatability model 65 for computing a translatability score TS for a phrase suggestion.

In one embodiment, the computation of translatability of a source phrase can be derived from the parallel corpus used in generating the SMT model 54. Since the biphrase table 36 of the SMT model may include two or more biphrases with the same source phrase s, but different target phrases, a translation score ts of each of these biphrases is computed, and a maximum translation score (mts), which is the highest translation score is identified. The maximum translation score (mts) is used as the translatability score TS for the source phrases in the source phrase table 50, or the translatability score TS can be some function of the mts. Hence, source phrases that have high maximum translation score are more likely to be proposed to the user.

In this embodiment, the translation score ts may be computed as a function of one or more of the statistics of the respective biphrase. These statistics may be used as features which are weighted with respective feature weights. The mts is then a translation score is which is maximized over all biphrase-table entries, for a given source phrase.

In an exemplary embodiment, mts is computed as follows:

$$mts(s) = \max_t \sum_i \lambda_i * \log f_i(s, t)$$ Eqn. (2)

In Equation 2, t are the translation equivalents of source phrases s, $f_i$ are the features (statistics) of the respective biphrase obtained from the biphrase table 36 of the translation model 54 of the SMT system, and the $\lambda_i$'s are their corresponding weights. As an example, a phrase-based SMT model 54 may be used which incorporates five biphrase-related features, as in the Moses translation system. These features, which may be used in computing the translation score in Eqn. 2, may include some or all of:

a. p(s|t): Reverse phrasal probability: probability of observing the source phrase in a sentence pair in a parallel corpus given the target phrase, b. lex(s|t): Reverse lexical probability: weighted probability computed from the probabilities of observing each of the word(s) of the source phrase in a sentence pair, given the respective word(s) of the target phrase, c. p(t|s): Forward: phrasal probability: probability of observing the target phrase in a sentence pair, given the source phrase, d. lex(t|s): Forward lexical probability: weighted probability computed from probabilities of observing each of the words of the target phrase given the respective word of the source phrase, and e. Phrase penalty, which penalizes shorter phrases, to promote translations which use fewer biphrases. (see www.statmt.org/moses/?n=FactoredTraining.ScorePhrases).

The first four of these five features may be computed on a parallel corpus of bi-sentences and stored in the biphrase table 36 in advance. The last feature is computed in the same way for all biphrases, for example, two word phrases are penalized more than three word phrases, and so forth. In other embodiments, the phrase penalty is fixed for each biphrase, as in the Moses system.

As will be appreciated, the features used in computing the translation score $$\left(\sum_i \lambda_i * \log f_i(s, t)\right)$$

of a biphrase may depend in part on the type of SMT system being employed and may include fewer, more, or different features. In some embodiments, only a single one of the exemplary features may be employed, in which case, feature weighting is not needed. In other embodiments, one of these features is combined with one or more other features, such as conditional entropy as described below.

The maximum translation score (mts) for each source phrase can be stored in the phrase table 50 as its translatability score TS, or the translatability score may be some function of the mts.

While the exemplary source phrase table 50 includes only one translatability score for each source phrase, this does not limit the SMT model 54 at translation time, since the SMT model can use any of the biphrases stored therein, and is not limited to using the biphrase corresponding to the mts.

In other embodiments, a metric based on conditional entropy ce(s) is used to prioritize the suggested phrases. This metric can be used in combination with or in place of the maximum translation score mts(s) as the translatability score TS. The conditional entropy of a candidate source phrase s may be computed as a function of the conditional entropy of a set T of target phrases t that are stored in biphrases in table 36 as translations of the source phrase s, and the relative frequency of s in a corpus of source sentences such as the source side of parallel corpus 110. The conditional entropy can be computed as an aggregate, over all target phrases in the set T, of a function of p(t|s), where p(t|s) is the forward phrasal probability of finding target phase t given s in a parallel corpus, such as corpus 110, as discussed above.

The conditional entropy of a source phrase s can thus be defined as:

$$ce(s) = H(T|s) \cdot p(s) \quad \text{Eqn. (3)}$$

In Equation 3, T are the set of possible translation equivalents of source phrases s, and H(T|s) is the conditional entropy of target phrases given a specific source phrase s. The probability values for computing p(t|s) are taken directly from the phrase table 36. The term H(T|s) rewards source phrases for which the SMT system has more options to choose from during decoding, and can be computed as follows:

$$H(T|s) = \Sigma_t p(t|s) \log p(t|s) \quad \text{Eqn. (4)}$$

In Eqn. 3, H(T|s) is coupled with p(s) which represents the strength of the evidence s and is computed as the relative frequency of s in the corpus. A sigmoid function of the translatability scores can be applied to bring them to the [0-1] range. For further details on the use of conditional entropy, see DeNero, J., Gillick, D., Zhang, J., and Klein, D., "Why generative phrase models underperform surface heuristics, in *Proc. Workshop on Statistical Machine Translation*, StatMT '06, pp. 31-38, ACL (2006), and Moore, R. and Quirk, C., "An iteratively-trained segmentation-free phrase translation model for statistical machine translation," in *Proc. 2nd Workshop on Statistical Machine Translation*, pp. 112-119, ACL (2007).

2. Fluency: The phrase suggestions shown should be fluent with respect to the input already provided by the user. One way of ensuring it to extract only those phrase suggestions whose prefix matches with the suffix of the agent's partial input. Note that on the interface, the matched prefix is not shown. Fluency can be improved by using the source language model 68 to compute language model scores for the source language for text string which include a prefix B and suffix C and to select phrases C which provide a high language model score when considered in combination with the input text B, e.g., up to a maximum number of already input words.

The language model is generated from a source language monolingual corpus. Then, given an input string that the user has typed or has already appended one or more words, the language model frequencies for strings in which the last word(s) of the input text is the suffix, are retrieved. The fluency feature may be computed as a function of a set of probabilities of seeing each of a string of words in its respective context, i.e., considering the previous words, e.g., by multiplying the probabilities. For example, in the case where the user has entered The license and the system retrieves a candidate phrase which is was received, the language model probabilities of The license, license was, and was received are retrieved and multiplied together. This is for the case of a bigram language model. As will be appreciated, n-gram language models where n is greater than 2 can be used alone or in combination with a bigram model. Where a candidate phrase includes more than two words, the language model score is normalized to be equivalent to a single word.

3. Semantic relatedness: To minimize the deviation from the meaning of the intended text, a method for measuring the semantic relatedness between the suggestions and the typed text can be employed. The fluency criterion above has an effect of keeping the suggestions semantically related to the typed input. However, its effect is limited and is fairly local. It ignores the rest of the input already typed by the user. Hence, to avoid deviating too far from the meaning of the text typed so far by the user, a method for measuring the semantic similarity of the suggestion and the typed text is incorporated. The semantic similarity score is weighted and integrated in the complete score of the suggestion (Eqn. 1).

Two methods for measuring semantic relatedness are suggested, by way of example. In one embodiment, the semantic relatedness model 66 is generated by a Latent Dirichlet Allocation (LDA) algorithm for measuring the sematic similarity between texts (see, for example, Blei et al., "Latent Dirichlet Allocation," Journal of Machine Learning Research 3 993-1022 (2003)). LDA is a generative probabilistic model which represents texts by latent topics. An LDA model is learnt in an unsupervised manner from a training corpus of source documents in the domain of interest. In one embodiment, this is the source side of the training part of the bilingual corpus. In this model, each document is represented by a vector of latent topics, where the value of each entry is the probability that the document belongs to the corresponding topic. Thus for example, dog and cat could be clustered together as a topic which roughly corresponds to animal, although since the model is unsupervised, the cluster does not receive a label. Then, if either dog or cat is found in the source text (or the candidate source phrase to be appended) it is assigned a high probability for the "animal" cluster. Given the LDA-representations of documents (source text and text to be appended), their semantic similarity can be compared by measuring the distance between the topic vectors. Similarity can be determined for example, by cosine similarity or other method of comparing vectors. In the authoring case, the semantic similarity of typed text is measured against each of the suggestions. As will be appreciated, the longer the typed text is, the more reliable the similarity is expected to be. The semantic relatedness feature can thus take into account a much larger portion of the initial text than can the fluency feature since it can readily take into account an entire sentence, paragraph, or a larger portion of the entered source text, whereas the fluency feature is limited to the maximum size of n-grams that the language model can handle (usually up to about 6 tokens in length).

A second metric which can be used for computing semantic relatedness is based on the DICE coefficient (Dice, L. R., "Measures of the amount of ecologic association between species," *Ecology*, 26(3):297-302 (1945)), which measures, based on corpus statistics, the tendency of words to co-occur. For a pair of words, $w_1$ and $w_2$, DICE is computed as follows.

$$DICE(w_1, w_2) = \frac{2 \cdot \text{Count}(w_1 \wedge w_2)}{\text{Count}(w_1) + \text{Count}(w_2)} \quad \text{Eqn. (5)}$$

The Count function is the number of sentence-occurrences in the corpus (we used the source side of the bilingual training corpus) and $w_1\hat{\ }w_2$ denotes the joint occurrence of the two words in a single sentence. This metric can be used to compute the relatedness of the suggested phrase with the entire typed input, averaging on all possible word-pairs between the typed and suggested texts (excluding stopwords). The rationale is that if the suggested phrase contains words that tend to co-occur with the typed text, they are more likely to be related. The square root of the DICE score can be used in order to scale to more similar ranges of the other scores.

In one embodiment, the displayed source phrases are thus jointly scored using their translatability and one of the other features, such as semantic relatedness and/or fluency according to Eqn. 1, which can be formulated as shown in Eqn. 6.

score($C$)=fluency($ABC$)*translatability($BC$)*semantic-relatedness($A,BC$) Eqn. (6)

In some embodiments, the three features may be weighted with respective weights. The displayed source phrases (segment C in FIG. 3) are thus jointly scored using a weighted product of the fluency FS for ABC, translatability TS for the phrase BC (mts(s) or ce(s)) and semantic relatedness score (SRS) output by the model 66. The top-k of these source phrases are then displayed on the interface for the user to select from. However, other functions are contemplated which aggregate these features in an optionally weighted manner, as discussed for Eqn. 2 above.

The top-K of these source phrases C are then displayed on the interface for the user to select. While the scores are shown in parentheses in FIGS. 3 and 7, it is not necessary for the user to be presented with these values. Rather, the candidates could be ordered alphabetically or according to their ranking, or the like. These ranking scores are normalized per word, so that longer phrases are not penalized due to their added length.

The exemplary interface 22 and system 10 find particular application in customer care centers of multi-national organizations, which often have a diverse multilingual customer base. The agents in these centers can use the interface to compose messages to customers effectively (accurately and quickly), irrespective of the target language. The interface does not need a significant investment in specialized resources, apart from a statistical machine translation system that may already be in use for interpreting incoming messages. This enables the interface to be deployed very easily for a new language pair and domain.

Figure 9:
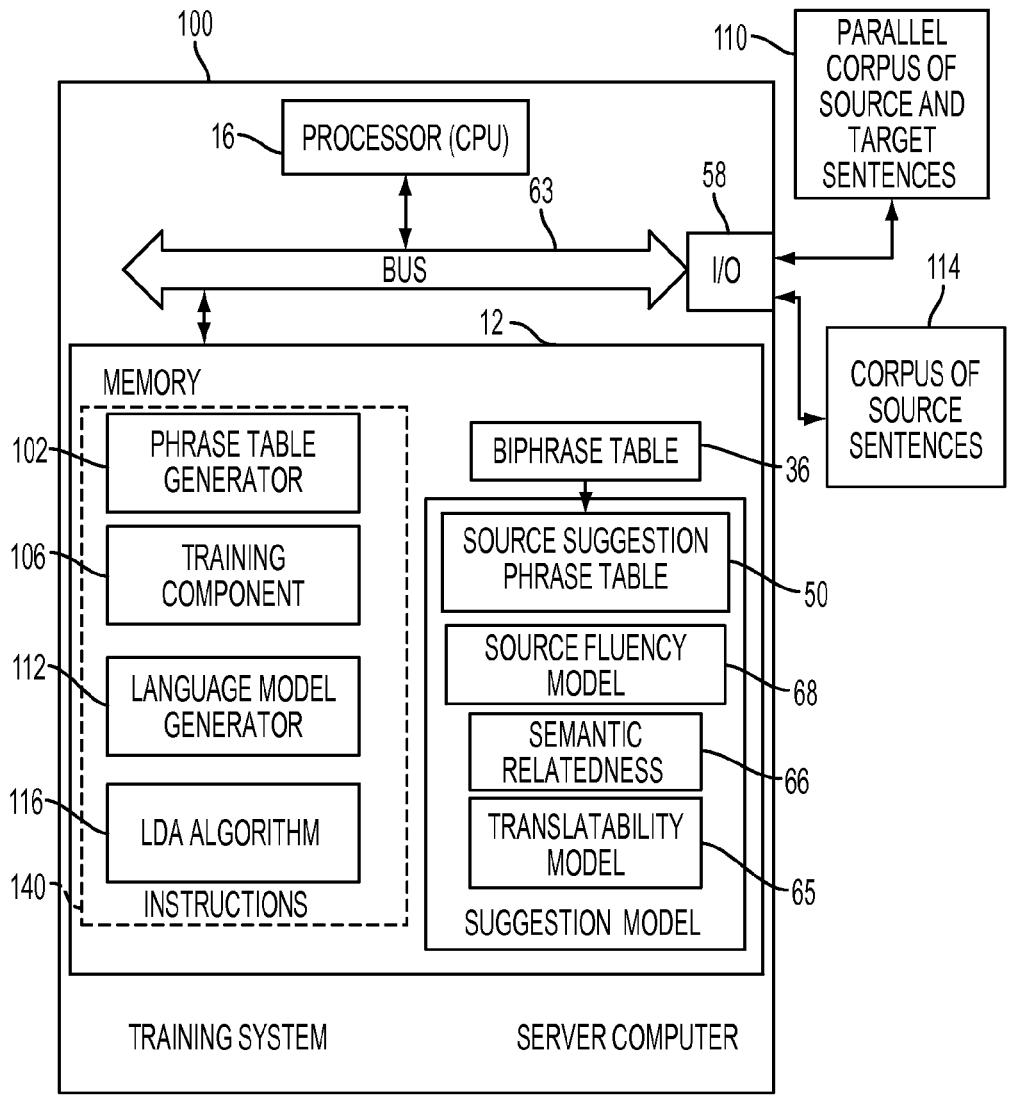
FIG. 9 is a functional block diagram of a training system for generating the cross-language authoring system of FIG. 1 in accordance with another aspect of the exemplary embodiment.

FIG. 9 illustrates an exemplary system 100 for forming the authoring system of FIG. 1. Similar elements are accorded the same numerals. The system 100 includes a phrase table generator 102 which generates the source suggestion table 50 from statistics of a biphrase table 36 for the two languages of interest using a translatability scoring model 65 (e.g., Eqn. 2). A training component 106 learns the weights for Eqn. 2, e.g., on a development corpus of source sentences in a particular domain of interest. Learning the weights of the statistics of a biphrase table is done so as to maximize the translation accuracy on the development set. One method for doing this is called MERT (Minimum Error Rate Training, see, for example, F. J. Och, "Minimum Error Rate Training in Statistical Machine Translation," 41*st Annual Meeting of the Association for Computational Linguistics (ACL)*, pages 160-167, Sapporo, Japan (July 2003). The relative weights of the components of Eqn. 1 (outputs of 66, 68 and 65) in FIG. 9, can be computed based on user feedback (history of user actions on the interface).

The biphrase table 36 may be generated from a parallel corpus 110 of documents in the source and target languages which are aligned at the sentence level, i.e., the target sentence in each pair is predicted to be a translation of the paired source sentence. The corpus may be specific to a domain of interest. For example, if the author is working in customer service for a printer manufacturer, some of the parallel sentences may be derived from technical manuals in the source and target languages. A language model generator 112 generates the source language model 68 from a monolingual corpus 114 of source sentences, which could include or be the source side of the parallel corpus 110. An semantic relatedness algorithm 116 is used to compute the semantic relatedness (e.g., LDA) model 66 on the source corpus 114. Components 102, 106, 112, 116 may be in the form of software instructions 140 stored in memory 12 of the training system which are implemented by processor 16.

To facilitate providing immediate suggestions of phrases, an inverted index of the phrase table 50 can be generated, indexing all prefixes of the source phrases in the table, where the prefixes can include more than one word in some cases. This enables providing suggestions quickly by retrieving, from the index, all phrase table entries which have one or more of the typed few words as a prefix. The source suggestion phrase table 50 contains a single entry (translatability score TS) per source phrase with the pre-computed estimation of the phrase's translatability by the scoring model 65. In the exemplary embodiment, this is the maximal translation score computed in advance based on the features in the original biphrase table 36 and their weights in the translation model (Eqn. 2). Indexing and retrieval can be performed, for example, using the Lucene search engine library: http://lucene.apache.org). In other embodiments, the table 50 may be incorporated in the biphrase table, with an extra feature being the mts of the source phrase, with every biphrase that includes the same source phrase having the same mts score. In other embodiments, conditional entropy is used to generate the translatability score TS, as discussed above.

To display similar sentences 86 from the translation memory, an inverted index of the sentences in the translation memory may be created. Whenever the user types a word, this index may be queried for sentences that best match the already-typed text are displayed. Sentences are displayed according to a default ranking of a suitable retrieval system.

The interactive nature of the system is improved by the near-instant response from the authoring system. Thus, even if large translation models and corpora are employed, users can be provided with a prompt response to their actions.

Translation of the source text can be performed with any suitable translation system. See for example, U.S. Pub. Nos. 2008/0300857, 2006/0190241, 2007/0150257, and 2007/0265825. A suitable phrase-based SMT system is the MATRAX™ system developed by Xerox, although the method is not limited to such a translation system.

Figure 10:
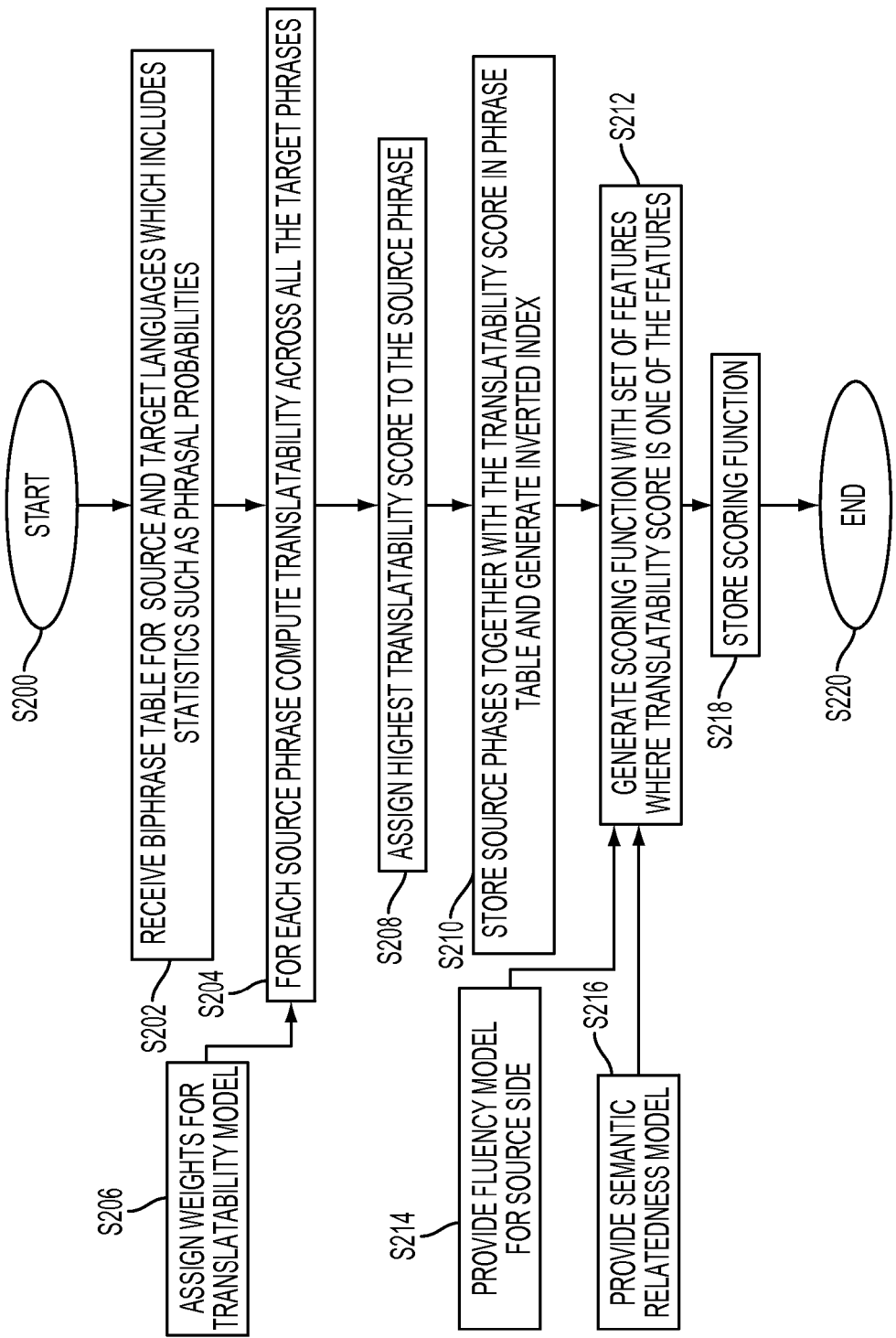
FIG. 10 is a flow chart of a method for training the cross-language authoring system in accordance with another aspect of the exemplary embodiment.

FIG. 10 briefly describes a method for generating the authoring system of FIG. 1, which can be performed with the system of FIG. 9.

The method begins at S200. At S202, statistics for each of a set of biphrases (e.g., in the form of a biphrase table 36) are received (or generated internally).

At S204, for each biphrase, a translation score is computed, based on the statistics and selected weights. A precursor to this step may include at S206, e.g., assigning, e.g., computing, appropriate weights.

At S208 for each source phrase present in the biphrase table its maximum translation score, over all biphrases in which it is found in the biphrase table, is assigned as its translatability score. In other embodiments, a conditional entropy score is computed.

At S210, an entry is created in the source suggestion phrase table 50 for each source phrase and stored together with its translatability score. An inverted index may be created for the source suggestion phrase table 50, as described above.

At S212, a suggestion scoring function 64 is stored which takes as input the translatability score and may include other features, such as one or more of a fluency (e.g., language model) feature and a semantic relatedness feature. As precursors to step S212, one or more additional model generating steps S214, S216 may be performed.

At S218, the scoring function 64 and the various models used in computing its feature inputs are stored in memory. The method ends at S220.

The method illustrated in FIG. 2 and/or FIG. 10 may be implemented in a computer program product that may be executed on a computer. The computer program product may be a non-transitory computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2 and/or FIG. 10, can be used to implement the method.

An advantage of the exemplary SMT driven authoring system and method is that it is able to produce better replies in the target language. Another advantage is that it is able to reduce the authoring cost. The authoring cost when the interface is not used is the cost (or time taken) in typing all the words in the intended message S. The cost when the interface is used can be considered as a combination of costs of various interface operations used by the agent, as illustrated in Eqn. 7.

$$\text{cost}(R) = \sum_i \tau(o_i) * n(o_i) \qquad \text{Eqn. (7)}$$

In equation 7, $o_i$ is an operation permitted by the interface, $\tau(o_i)$ is the average time taken for performing the operation $o_i$, and $n(o_i)$ is the number of times an operation $o_i$ is performed for composition of the sentence R. Using the types of operations described herein, such as reading candidate suggestions and suggestion sentences and clicking on an appropriate one, the user can reduce typing time.

While in FIGS. 3, 7, and 8, the authoring interface phrase suggestion region 46 displays a list of suggestions in which two and three token suggestions are intermingled with one word suggestions (the ranking taking into account the number of words), in another embodiment, the one, two and three token suggestions may be displayed in separate lists, as illustrated in FIG. 11.

Without intending to limit the scope of the exemplary embodiment, the following Example illustrates one application of the system and method.

EXAMPLE

A prototype system 10 with an interface implemented using PHP and AJAX were generated. The system may be used to author sentences of 'technical manual' domain, where the agent knows English, while the target language is French.

Assume that the user wants to convey a message 'the license agreement will be shown' in French. He takes the following steps on the interface:
1. Type 'the license' (FIG. 3)
2. Select phrase suggestion 'agreement' (FIG. 7)
3. Select either the phrase suggestion 'will be' from the candidates 42 or the sentence suggestion 2 which includes 'will be displayed' (FIG. 7)

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An authoring method comprising:
generating an authoring interface configured for assisting a user to author a text string in a source language for translation to a target string in a target language;
receiving source text comprising initial text entered by a user through the authoring interface in the source language;
with a processor, selecting a set of source phrases from a stored collection of source phrases, each of the set of source phrases including at least one token of the initial source text as a prefix and at least one other token as a suffix, the selection of the set of source phrases being based on a translatability score, wherein the translatability score, for each of a stored set of source phrases, is a function of statistics of at least one biphrase in which the source phrase occurs in combination with a corresponding target phrase in the target language, each biphrase being one of a collection of biphrases;
proposing a set of candidate phrases for display on the interface, the candidate phases each comprising the suffix of a respective one of the source phrases in the set of source phrases;
providing for receiving a user's selection of one of the candidate phrases in the set of candidate phrases and, where one of the candidate phrases in the set of candidate phrases is selected by the user, appending the selected one of the candidate phrases to the source text; and
optionally, repeating the receiving, selecting, proposing and providing to generate the text string in the source language, wherein in the repeating, the received text comprises the initial source text and previously appended text.

2. The method of claim 1, further comprising translating the text string with a machine translation system using a collection of biphrases.

3. The method of claim 2, wherein the stored collection of source phrases is derived from the same collection of biphrases used in translation of the text string.

4. The method of claim 1, wherein for a source phrase which occurs in a plurality of biphrases in the collection, the translatability score is a maximum one of translation scores over all the biphrases in which the source phrase occurs.

5. The method of claim 1, wherein the biphrase statistics are derived from a parallel corpus of sentences in the source and target languages.

6. The method of claim 1, wherein the biphrase statistics are selected from phrasal probabilities, lexical probabilities, a phrase penalty, and combinations thereof.

7. The method of claim 1, wherein the translatability score is computed as a weighted function of a plurality of the statistics.

8. The method of claim 1, wherein the translatability score of a source phrase s is computed a function of $H(T|s)$ and $p(s)$, where $H(T|s)$ is the conditional entropy of a set T of target phrases t stored in biphrases as translations of the source phrase s, the conditional entropy being computed as an aggregate, over all target phrases in the set T, of a function of $p(t|s)$, where $p(t|s)$ is the probability of finding target phase t given s in a parallel corpus, and $p(s)$ is computed as the relative frequency of s in a source side of the parallel corpus.

9. The method of claim 1, further comprising providing for receiving a user's selection of text other than one of the candidate phrases in the set of candidate phrases and appending the other text to the source text.

10. The method of claim 1, wherein the selection of the set of source phrases is also based on at least one feature other than the translatability score, the at least one other feature being computed based on the input text.

11. The method of claim 10, wherein the selection of the set of source phrases includes computing a function of the translatability score and the at least one other feature.

12. The method of claim 10, wherein the at least one other feature is selected from the group consisting of a fluency score and a semantic relatedness score.

13. The method of claim 1, further comprising:
providing for the user to select at least one of the source and target languages; and
providing a plurality of the source phrase collections, the plurality of source phrase collections comprising one source phrase collection for each of a set of source and target language pairs.

14. A computer program product comprising a non-transitory medium which stores instructions, which when executed by a processor, perform the method of claim 1.

15. An authoring system comprising memory which stores instructions for performing the method of claim 1 and a processor in communication with the memory for executing the instructions.

16. An authoring system comprising:
an interface generator for generating an authoring interface on an associated display device for assisting a user to author a text string in a source language for translation to a target string in a target language;
a suggestion system for receiving source text comprising initial text entered by a user through the authoring interface in the source language and for selecting a set of source phrases from a stored collection of source phrases, each of the set of source phrases including at least one token of the initial source text as a prefix and at least one other token as a suffix, the selection of the set being based on a translatability score which, for each of a stored set of source phrases, is a function of statistics of at least one biphrase of a collection of biphrases, in which biphrase the source phrase occurs in combination with a corresponding target phrase in the target language, the suggestion system proposing a set of candidate phrases for display on the generated interface, the proposed candidate phases each comprising the suffix of a respective one of the source phrases in the set of source phrases;
the authoring interface being configured for receiving a user's selection of one of the candidate phrases in the set and, where one of the candidate phrases in the set is selected by the user, for appending the selected one of the candidate phrases to the source text;
the suggestion system being configured generating the text string in the source language from the initial source text and appended text; and
a processor which implements the interface generator and suggestion system.

17. The system of claim 16, wherein the suggestion system comprises a scoring function which scores candidate phrases based on the translatability score of the corresponding source phrase in the set of source phrases and a fluency score and a semantic relatedness score.

* * * * *